3,043,136
FORCE MOMENT TYPE STRAIN
GAUGE SUPPORT
Patrick J. Cunningham, Fullerton, and Mari B. Wolf, Anaheim, Calif., assignors to The Task Corporation, Anaheim, Calif., a corporation of California
Filed May 20, 1960, Ser. No. 30,552
13 Claims. (Cl. 73—133)

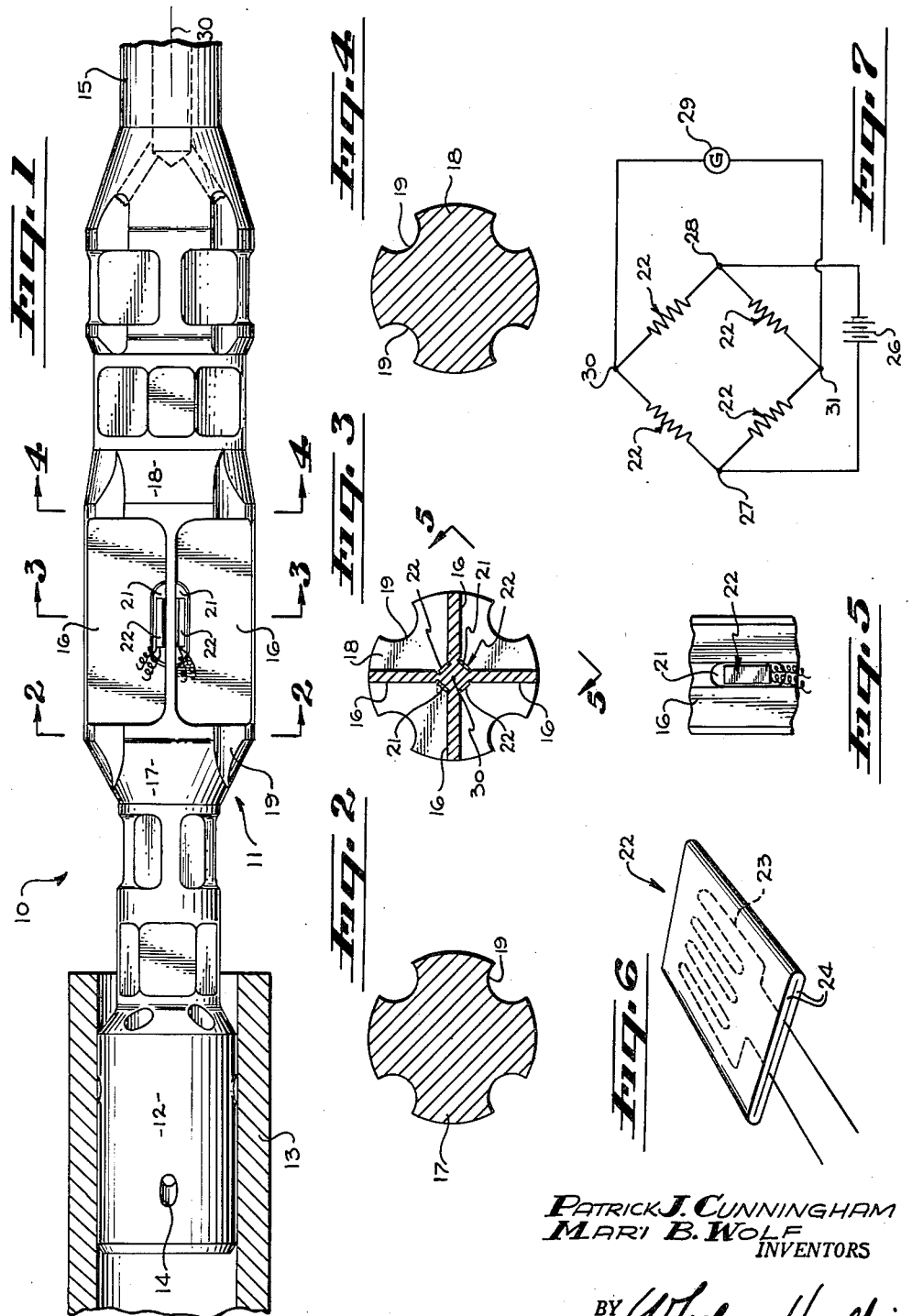

This invention relates generally to strain gauge supports, and more particularly concerns improvements in force moment type strain gauge supports wherein roll forces or force moments applied to a support are adapted to strain the support surfaces carrying gauges so that the latter are therefore strained to change their electrical resistance characteristics.

In the wind tunnel testing of models of small aircraft or missiles, it is the practice to mount the models upon what are known as force balances of such construction and design in relation to the positions of force gauges carried by the balances that model loading will be reflected in gauge outputs or indicated force measurements corresponding to loading. Such loading will normally include axial, side, chord and roll forces, the latter being applied as force moments exerted about the axis of the balance. It is the intent and purpose of the present invention to disclose improvements in strain gauge supports adapted to be incorporated in such force balances for measuring roll forces or force moments, as distinguished from axial, side and chord forces.

Accordingly, as broadly conceived the invention has for its primary object the provision of an improved force moment type strain gauge support comprising a longitudinally extending body having web means extending in longitudinal and lateral planes and forming a corner, the body having a longitudinally extending and flattened surface at the corner for supporting a strain gauge adapted to sense strain produced at the flattened surface in response to transmission by the web means of a force moment exerted above the longitudinal extent thereof. The primary purpose of the web means is to provide the desired degree of flexing and strain for communication to the strain gauge itself to change the electrical resistance characteristics thereof, which changes are readily detecable in an electrical circuit which includes the strain gauge as a component thereof. While the flexing of a web has been previously utilized to impart strain to a resistance type strain gauge attached to the web, the high degree of flexing and strain that can now be imparted to the strain gauge in response to roll force transmissison by web means, all in accordance with the teachings of the invention, has not been known.

We have found that for a given force moment application or transmission, the flexing and strain produced in a strain gauge can be markedly increased if the web means are made to extend in longitudinal and lateral planes forming a corner, the latter having a longitudinally extending and flattened surface for supporting the strain gauge at the corners. As a result, the greatly increased strain communicated to the strain gauge by a given force moment application to the web means, is in turn reflected in greatly increased changes in the electrical resistance properties of the gauge which are then much more readily detectable. Correspondingly, it is then possible to detect slight changes in force moment application which were heretofore undetectable, showing that the present invention markedly improves the accuracy of roll force measurement.

More particularly, the web means comprise webs extending in axial radial planes that intersect along the axis of a body with which the webs are integral, the webs forming pairs of symmetrical interior corners at opposite sides of the planar intersection, these corners having longitudinally extending and flattened surfaces for supporting pairs of strain gauges. This construction of the body and webs is preferably, but not necessarily, incorporated into a balance on which a test model may be mounted in such a way as to be subject to application of roll force exerted about the body axis, all as will be explained.

Other objects and advantages of the invention, as well as the details of an illustrative embodiment, will be more fully understood from the following detailed description of the drawings, in which:

FIG. 1 is an elevation showing a roll force balance mounting a test model;
FIG. 2 is a cross section taken on line 2—2 of FIG. 1;
FIG. 3 is a cross section taken on line 3—3 of FIG. 1;
FIG. 4 is a cross section taken on line 4—4 of FIG. 1;
FIG. 5 is a view taken on line 5—5 of FIG. 3;
FIG. 6 is a perspective view of a strain gauge to be bonded to the device shown at FIG. 5; and
FIG. 7 is a circuit diagram showing the manner in which the strain gauges connected to the FIG. 6 body may be incorporated in a bridge circuit.

The device shown at 10 in FIG. 1 comprises what is known as a sting balance of the roll force measuring type. The balance comprises an axially elongated body 11 including means 12 for mounting a test model 13 subject to application of roll forces exerted about the body axis. The means 12 is shown as a cylindrical shank having dowel openings 14 for receiving connecting dowels fitted into corresponding openings into the test model 13. The opposite end of body 11 shown at 15 typically comprises a stem or sting part adapted to be supported by other structure, not shown, so as to position the test model in the proper orientation with respect to a wind tunnel passage.

Intermediate the body portions 12 and 15 are webs 16 extending in axial and radial planes and typically but not necessarily consisting of four like webs spaced at 90 degree intervals about the body axis. Integrally joined to the webs at axially opposite ends thereof are the body portions 17 and 18 which serve to transmit roll forces or force moments through the webs, body portion 17 being axially forward of portion 18. Finally, the portion 18 has side recesses 19 for the reception of electrical wiring extending from the strain gauges which will be described, to the exterior of the wind tunnel for force measurement purposes.

Referring again to the webs 16, they form pairs of symmetrical interior corners having longitudinally extending and flattened surfaces 21. The latter are at symmetrically opposite sides of the body axis 30, which is the axis of intersection of the radial planes of the webs 16. Bonded to the surfaces 21 which face away from body axis 30 are strain gauges 22 as best illustrated in FIGS. 1, 3 and 5. These gauges may be of the type shown in FIG. 6 wherein a continuous fine wire 23 shown in broken lines is formed as a grid and imbedded between two insulating layers 24 from which the two ends of the wire project. When fastened to a surface undergoing mechanical stress and strain, such a gauge undergoes equivalent strain in such manner as to proportionally change the electrical resistance properties of the wires.

Referring now to FIG. 7, the strain gauges 22 are conveniently connected into the Wheatstone bridge circuit illustrated. For measurement purposes, a source of current comprising a battery 26 is connected between terminals 27 and 28 representing the junctions between pairs of gauges 22, while a voltage sensitive instrument 29 is connected between terminals 30 and 31, representing the alternate junctions between gauge pairs 22.

In operation a roll force or force moment exerted about the axis 30 of the body 11 is transmitted through and by the webs 16 which tend to flex in response to such roll force application. The maximum strain is produced at the flattened surfaces 21 of the interior corners formed by the webs, and therefore is transmitted to the strain gauges 22 bonded to those symmetrical surfaces. Accordingly, the electrical resistance properties of the gauges 22 will be changed in like degree causing the bridge shown in FIG. 7 to become unbalanced with the result that a reading will be obtained from the instrument 29 corresponding to the magnitude of the force moment transmitted to the webs.

We claim:

1. An improved force moment type strain gauge support, comprising a longitudinally axially extending body having web means extending in longitudinal and lateral planes and forming a corner, said body having a longitudinally extending and flattened surface at said corner and facing away from the body axis for supporting a strain gauge adapted to sense strain produced at said surface in response to transmission by said web means of a force moment exerted about the longitudinal extent thereof.

2. An improved force moment type strain gauge support, comprising a longitudinally axially extending body having webs extending in longitudinal and lateral intersecting planes and forming a pair of interior corners at opposite sides of said intersection, said body having longitudinally extending and flattened surfaces at said corners and facing away from the body axis for supporting strain gauges adapted to sense strain produced at said surface in response to transmission by said web means of a force moment exerted about the longitudinal extent thereof.

3. An improved force moment type strain gauge support, comprising a longitudinally and axially extending body having webs extending in longitudinal and lateral planes that intersect along said axis, said webs forming a pair of interior corners at opposite sides of said intersection, said body having longitudinally extending and flattened surfaces at said corners and facing away from the body axis for supporting strain gauges adapted to sense strain produced at said surfaces in response to transmission by said webs of a force moment exerted about said body axis.

4. An improved force moment type strain gauge support, comprising a longitudinally and axially extending body having webs extending in longitudinal and lateral planes that intersect along said axis, said webs forming a pair of interior corners at opposite sides of said intersection, said body having longitudinally extending and flattened surfaces at said corners and facing away from the body axis for supporting strain gauges adapted to sense strain produced at said surfaces in response to transmission by said webs of a force moment exerted about said body axis, said surfaces being substantially parallel.

5. An improved force moment type strain gauge support, comprising an axially elongated body having webs extending in axial radial planes that intersect along said axis and said body including portions integral with said webs at axially spaced opposite ends thereof, said webs forming a pair of symmetrical interior corners at opposite sides of said intersection, said body having longitudinally extending and flattened surfaces at said corners and facing away from the body axis for supporting strain gauges adapted to sense strain produced at said surfaces in response to transmission by said webs of a force moment exerted about said body axis.

6. The invention as defined in claim 5 in which said web planes are spaced at substantially 90 degree intervals about said axis, said surfaces being angled relative to said web planes.

7. The invention as defined in claim 6 comprising four relatively thin webs having equal axial and radial extent.

8. The invention as defined in claim 7 including a pair of electrical strain gauges fastened respectively to said surfaces for deformation therewith in response to transmission of said force moment, said gauges being connectible into an electrical circuit the output of which changes in accordance with the deformation of said surfaces.

9. The invention as defined in claim 8 in which said gauges are connected into a Wheatstone bridge circuit.

10. An improved force moment type sting balance, comprising an axially elongated body including means for mounting a test model subject to application of roll force exerted about the body axis, said body having webs extending in axial radial planes that intersect along said axis and said body including portions integral with said webs at axially spaced opposite ends thereof, said webs forming a pair of symmetrical interior corners at opposite sides of said intersection, said body having longitudinally extending and flattened surfaces at said corners and facing away from the body axis for supporting strain gauges adapted to sense strain produced at said surfaces in response to transmission by said body portions and webs of a force moment exerted about said body axis.

11. The invention as defined in claim 10 in which said webs are axially spaced from said means for mounting the test model.

12. The invention as defined in claim 10 in which said web planes are spaced at substantially 90 degree intervals about said axis, said surfaces being angled relative to said web planes.

13. The invention as defined in claim 12 comprising four relatively thin webs having equal axial and radial extent.

References Cited in the file of this patent

UNITED STATES PATENTS

| | | |
|---|---|---|
| 2,403,952 | Ruge | July 16, 1946 |
| 2,415,513 | Martin et al. | Feb. 11, 1947 |
| 2,865,200 | Gieseler | Dec. 23, 1958 |